US011074704B2

(12) United States Patent
Bleyer et al.

(10) Patent No.: US 11,074,704 B2
(45) Date of Patent: Jul. 27, 2021

(54) ERROR REDUCTION OF DEPTH MAPS

(71) Applicant: Microsoft Technology Licensing, LLC, Redmond, WA (US)

(72) Inventors: Michael Bleyer, Seattle, WA (US); Christopher D. Edmonds, Carnation, WA (US); Yuri Pekelny, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/240,596

(22) Filed: Jan. 4, 2019

(65) Prior Publication Data
US 2020/0219276 A1   Jul. 9, 2020

(51) Int. Cl.
G06T 7/50 (2017.01)
G06T 7/521 (2017.01)
G06T 5/40 (2006.01)
G06T 7/00 (2017.01)

(52) U.S. Cl.
CPC .......... G06T 7/521 (2017.01); G06T 5/40 (2013.01); G06T 7/0002 (2013.01); G06T 2207/10028 (2013.01); G06T 2207/30168 (2013.01)

(58) Field of Classification Search
CPC .............................. G06T 7/521; G06T 7/0002
See application file for complete search history.

(56) References Cited

U.S. PATENT DOCUMENTS

2015/0015569 A1*  1/2015  Jung ..................... G06T 15/005
                                                        345/419
2017/0195653 A1*  7/2017  Trail .................... H04N 13/344
2019/0220987 A1*  7/2019  Huang ..................... G06T 5/002

OTHER PUBLICATIONS

Lee, et al., "Surface Reflectance Estimation and Segmentation from Single Depth Image of ToF Camera", In Journal of Signal Processing Image Communication, vol. 47, Jul. 2016, pp. 452-462.
"International Search Report Issued in PCT Application No. PCT/US19/067691", dated Feb. 27, 2020, 13 Pages.
Powell, et al., "Color Correction Using Explicit Illumination Models, Color and Registered Range", In Proceedings of Workshop on Photometric Modeling for Computer Vision and Graphics, Jun. 22, 1999, pp. 64-71.
Prieto, et al., "Preparation and Enhancement of 3D Laser Scanner Data for Realistic Coloured BIM Models", In Journal of Visual Computer, vol. 36, Issue 1, Aug. 22, 2018, pp. 113-126.

* cited by examiner

Primary Examiner — Girumsew Wendmagegn
(74) Attorney, Agent, or Firm — Rainier Patents, P.S.

(57) ABSTRACT

The described implementations relate to reducing distance errors in depth maps. One example can detect blooming in a depth map. This example can identify a depth range affected by the blooming and take an action relating to the identified depth range to address the blooming.

19 Claims, 14 Drawing Sheets

ERROR REDUCTION OF DEPTH MAPS

BACKGROUND

Depth maps provide useful information in many scenarios, such as industrial settings, transportation, gaming, augmented reality, etc. Depth maps can be generated based in part upon light reflected from objects in a scene. In some instances, highly reflective objects in the scene can reflect so much light that sensors gathering the reflected light are overwhelmed. This occurrence can cause erroneous depth distances to be calculated for these highly reflective objects. Even more troublesome is that this occurrence can also cause erroneous depth distances to be calculated for other objects in the scene. The present concepts can reduce these erroneous distances in the depth map.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Figure 1A:
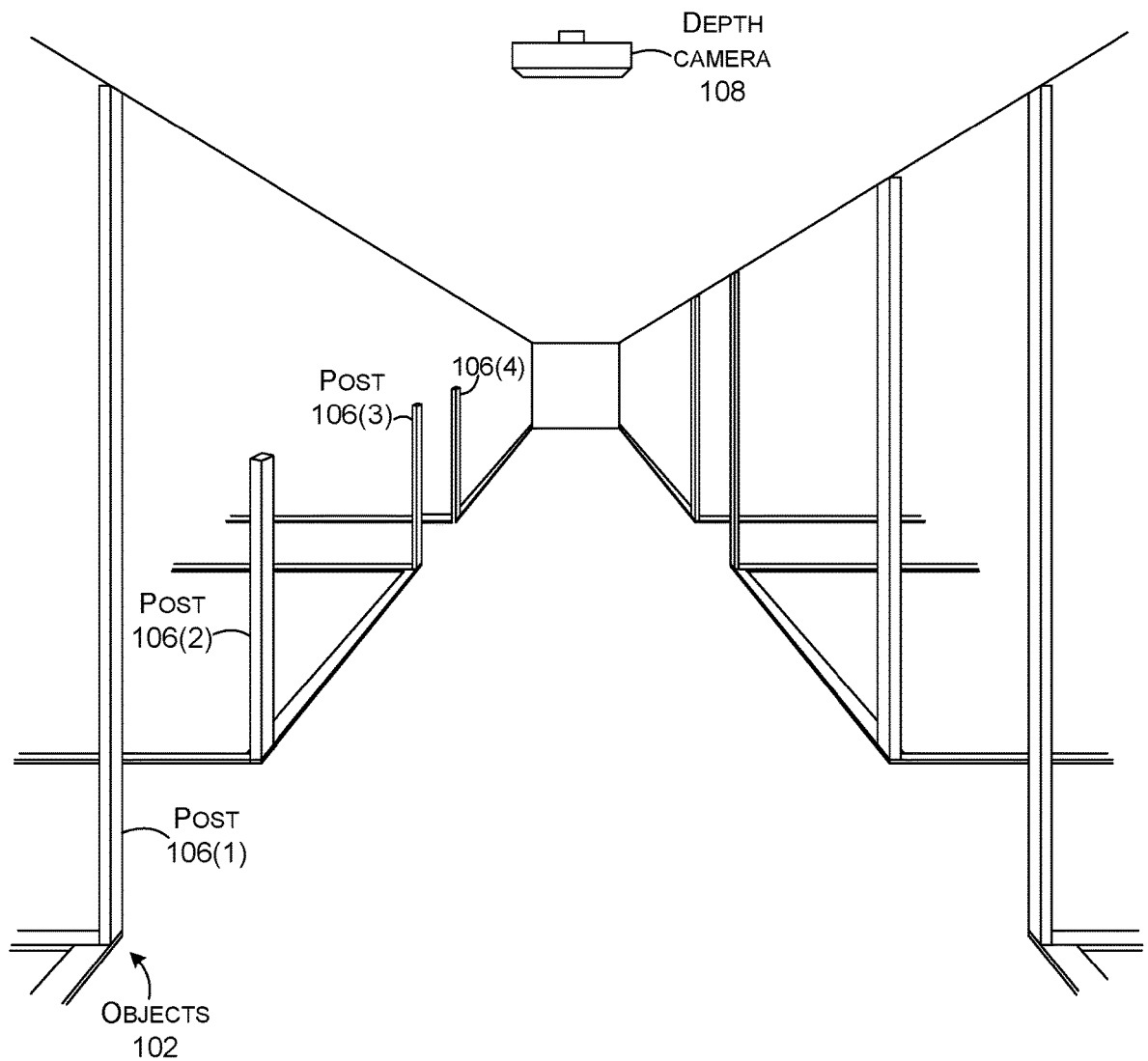
FIGS. 1A-1G and 2A-2C show example depth map scenarios in accordance with some implementations of the present concepts.

This discussion relates to depth maps. A depth map can show a scene and indicate distances to items in the scene, such as on a pixel-by-pixel basis, a per region basis, and/or a per object basis. Various factors can induce errors in the indicated distances. One such factor is blooming. Briefly, blooming can be viewed as an instance where a strong light signal from one region of the depth image bleeds into adjacent regions (e.g., creates blooming artefacts) so that erroneous distances are determined for the adjacent regions. Stated another way, a blooming artefact can be caused by reflections from one region that overflow into adjacent regions and create artefacts in those adjacent regions that cause the depths calculated for those regions to be erroneous. The present concepts can recognize blooming in the depth image and identify a depth range affected by the blooming. Various actions can be taken to address the blooming. From one perspective, blooming is a technical problem that causes inaccuracies in depth maps. The described implementations can provide a technical solution that reduces these blooming related inaccuracies.

FIGS. 1A-1G collectively show an example scene 100 that includes objects 102. In this example, scene 100 is a construction zone and the objects include a person or worker 104 (FIG. 1C) who is walking in the construction zone among posts 106. A depth camera 108 can sense depth data from the scene 100. For instance, the depth camera 108 can sense reflections off objects 102 in the scene and determine distances to those objects. Any type of depth camera can be employed, such as a time-of-flight depth camera, stereo depth camera, and/or structured light depth camera, among others.

Figure 1B:
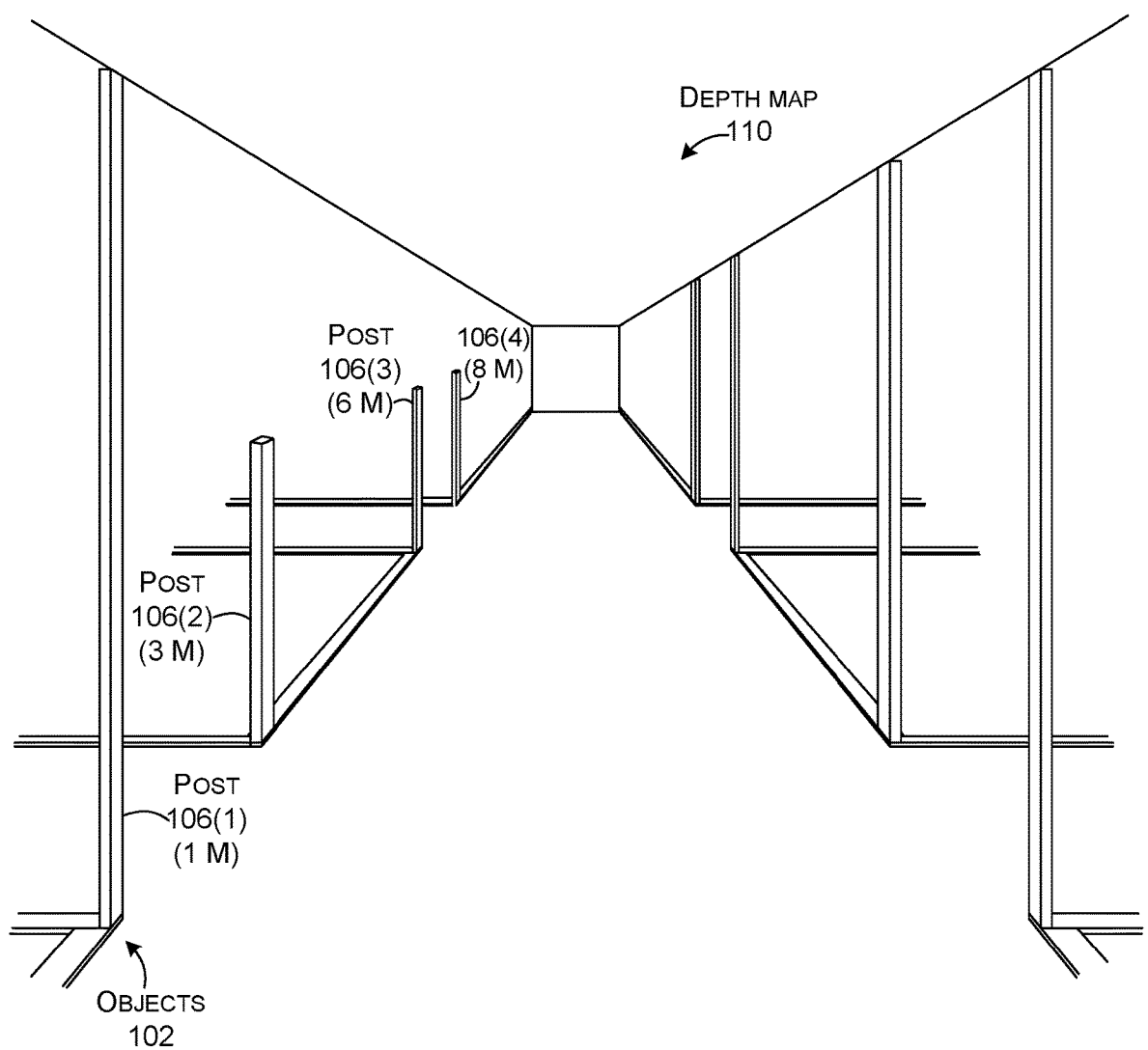

FIG. 1A shows scene 100 at a first instance. FIG. 1B shows a depth map 110 of scene 100 at the first instance as sensed by depth camera (108, FIG. 1A). (Note that the depth map is simplified to accommodate the limitations of line drawings). The depth map 110 shows distances to the objects 102 from the depth camera. For instance, the depth map shows the distance to post 106(1) is 1 meter, the distance to post 106(2) is 3 meters, the distance to post 106(3) is 6 meters, and the distance to post 106(4) is 8 meters. (Note in this representation, one distance is assigned to each object. Other implementations may include greater levels of detail, up to and including a distance per pixel.)

Figure 1C:
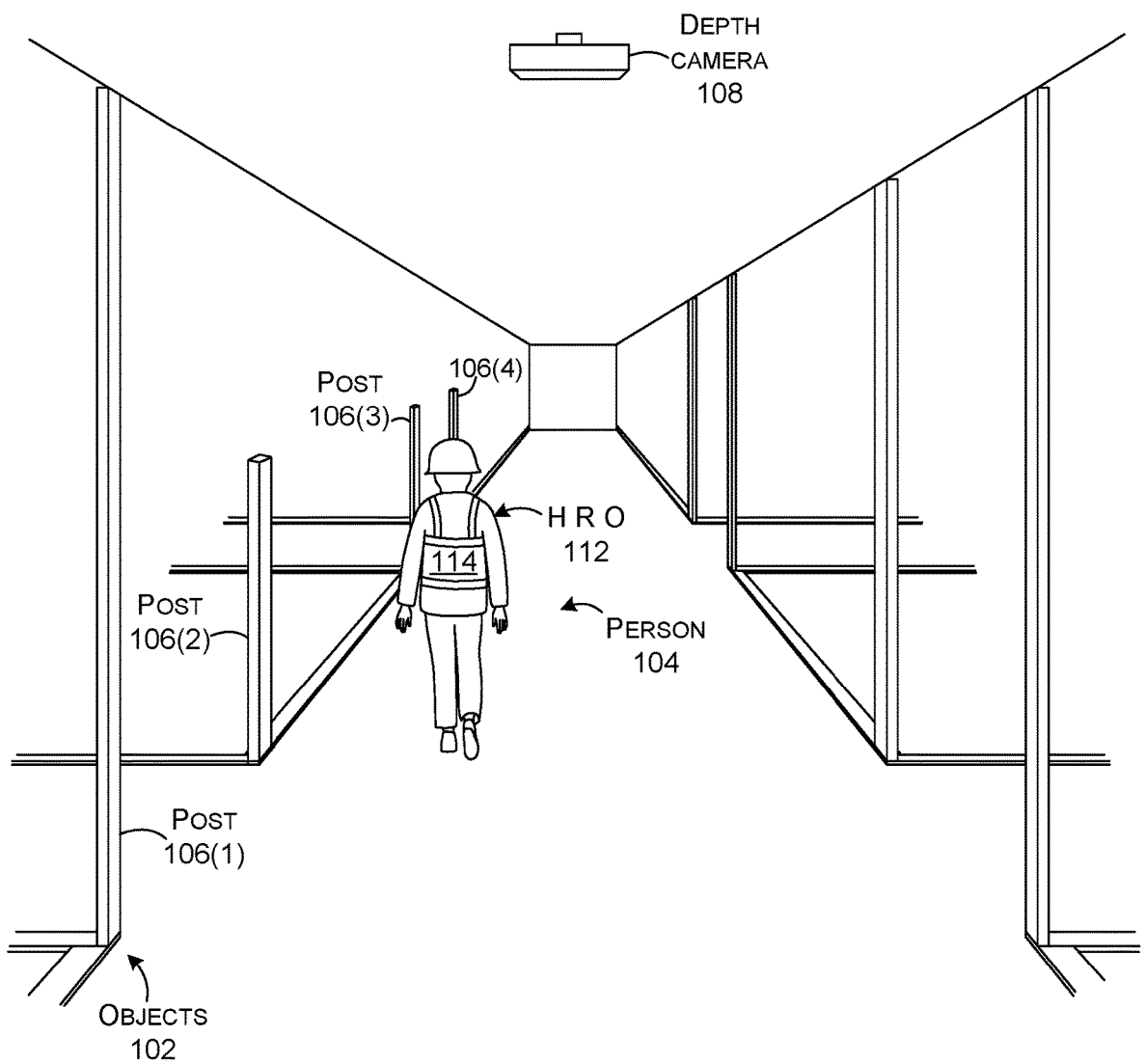

FIG. 1C shows scene 100 at a second instance where person 104 has entered the scene. In this example, the person 104 is wearing a highly reflective object 112 in the form of a reflective safety vest 114. Highly reflective objects 112 can detrimentally affect the accuracy of a depth map of the scene.

Figure 1D:
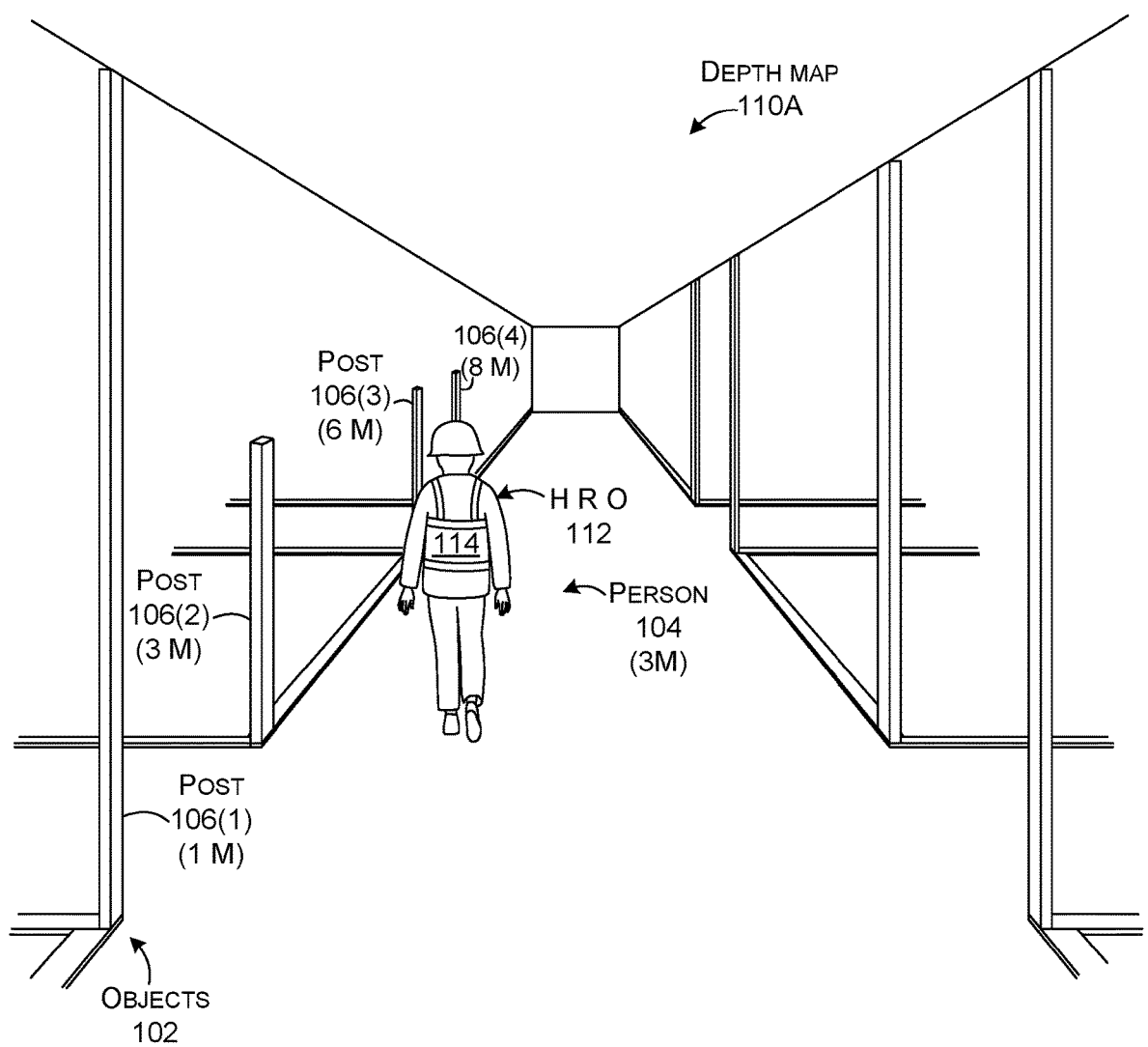

FIG. 1D shows an expected depth map 110A for the second instance. This expected depth map 110A shows the person 104 to be about the same distance from the depth camera as post 106(2) (e.g., about 3 meters). However, recall that highly reflective objects 112 can cause problems for the depth camera.

Figure 1E:
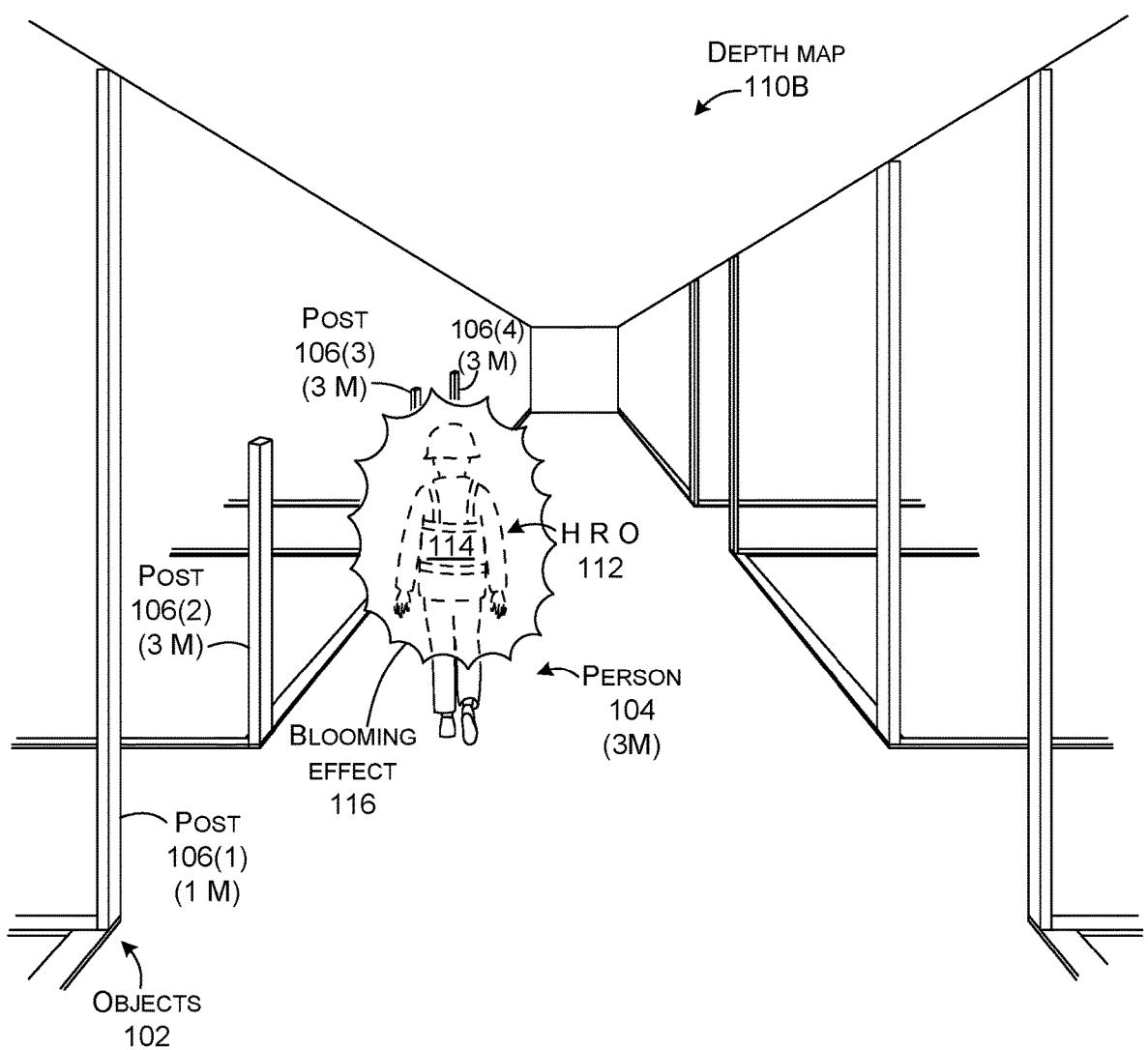

FIG. 1E shows an actual depth map 110B for the second instance. In this case, the reflective safety vest 114 causes aberrations in depth map 110B. These aberrations can be viewed as a blooming effect 116. The blooming effect 116 can be caused when such a strong reflective signal is returned from the highly reflective object 112 that the strong reflective signal overwhelms reflective signals of other objects 102 that are aligned in proximity to the highly reflective object (from the perspective of the depth camera 108). In this example, the objects that are aligned in proximity to the highly reflective object 112 are posts 106(3) and 106(4). Note, that the blooming effect 116 is so strong on the depth camera, that in the depth map 110B, posts 106(3) and 106(4) are indicated as the same distance as the person (e.g., 3 meters) rather than their actual distances of 6 and 8 meters, respectively.

Figure 1F:
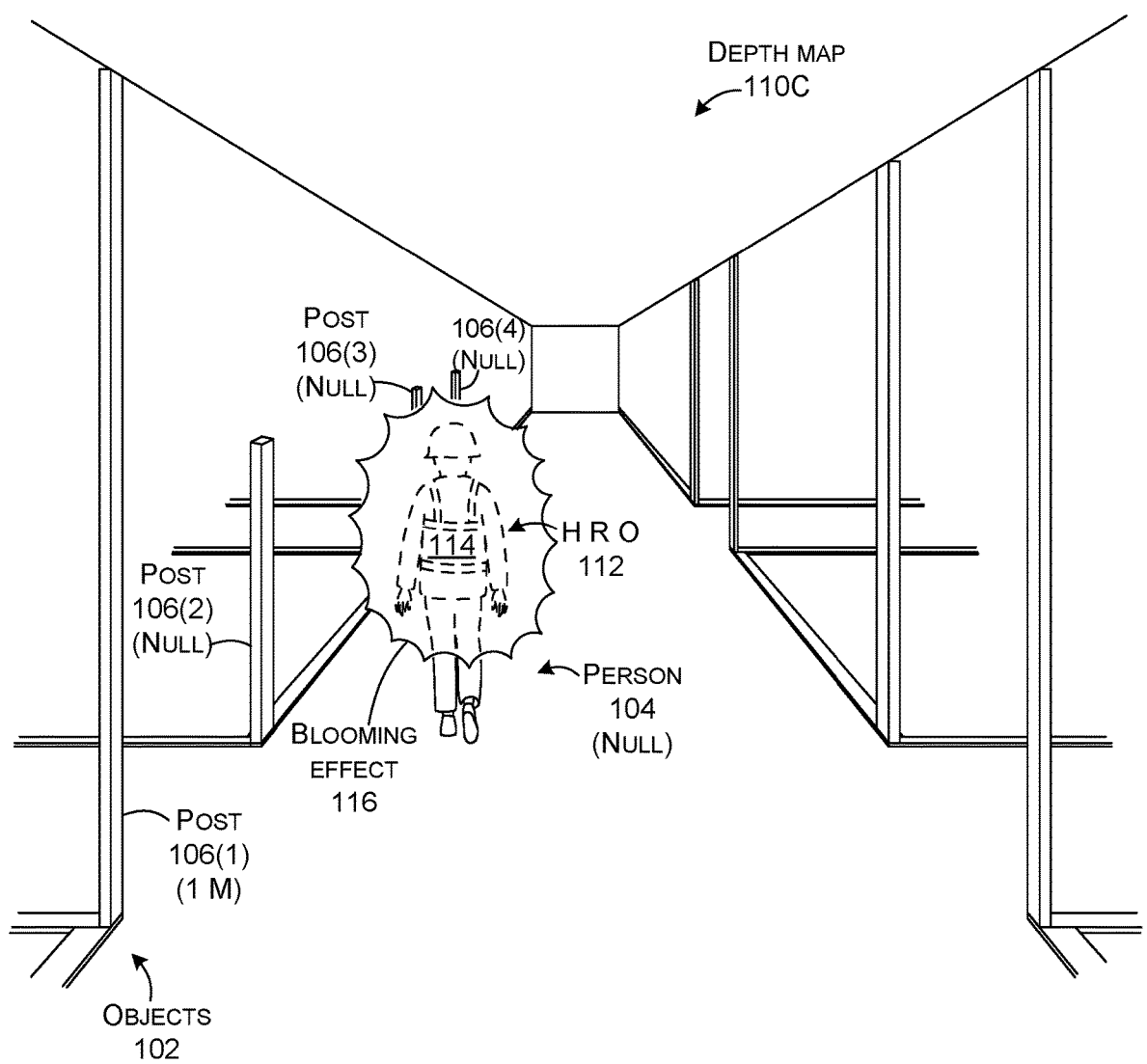

FIG. 1F shows a first way that the blooming effect 116 can be addressed. In this case, all objects 102 that appear on the depth map 110C to be at the distance of the blooming effect are assigned a distance of 'null' or 'not available'. Thus, in this case, the person 104, posts 106(2), 106(3) and 106(4) are all indicated at 3 meters and these distances are replaced by null values.

Figure 1G:
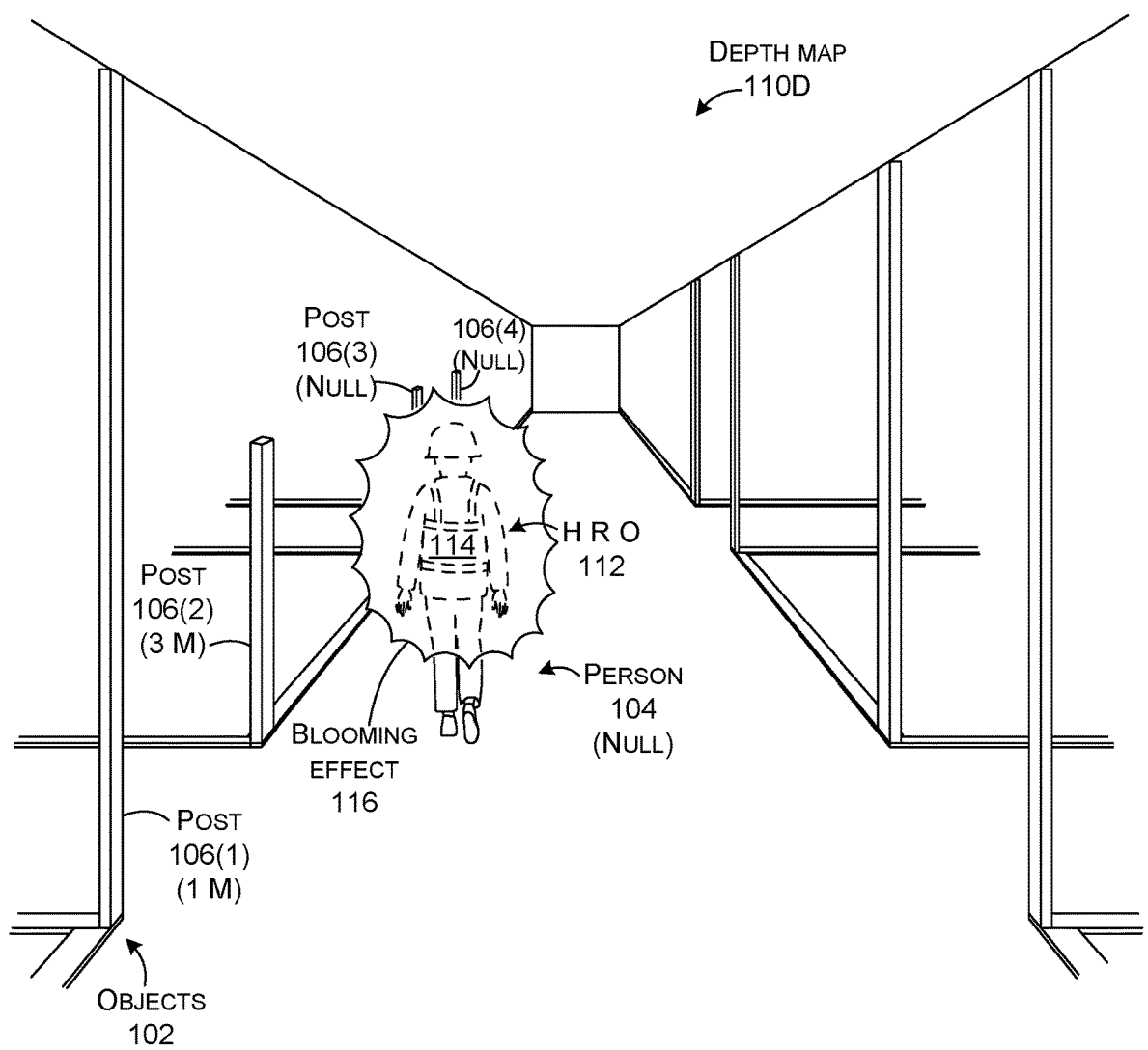

FIG. 1G shows an alternative solution to the blooming effect 116. In this case, all objects 102 that appear on the depth map 110D to be at the distance of the blooming effect 116 and are adjacent to the blooming effect are assigned a distance of null or not available. In this case, the person 104, posts 106(2), 106(3) and 106(4) are all indicated at 3 meters. However, post 106(2) is not adjacent to the blooming effect 116. Thus, post 106(2) retains its 3-meter value while distances for person 104 and posts 106(3) and 106(4) are replaced by null values. This solution recognizes that while post 106(2) has the same distance value as the blooming effect 116, the distance calculated for this post is not likely affected by the blooming effect of the highly reflective object 112.

Figure 2A:
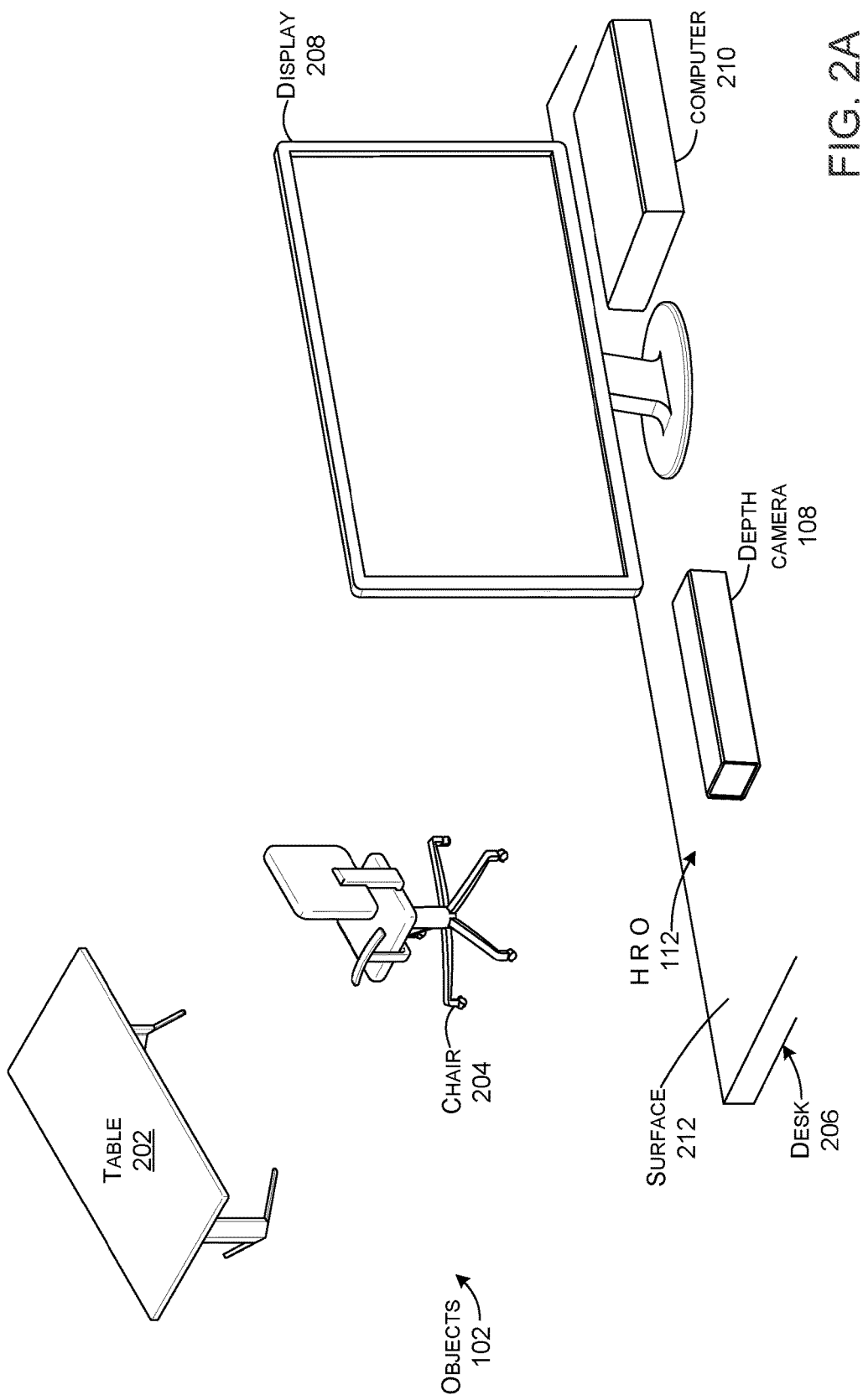
Figure 2B:
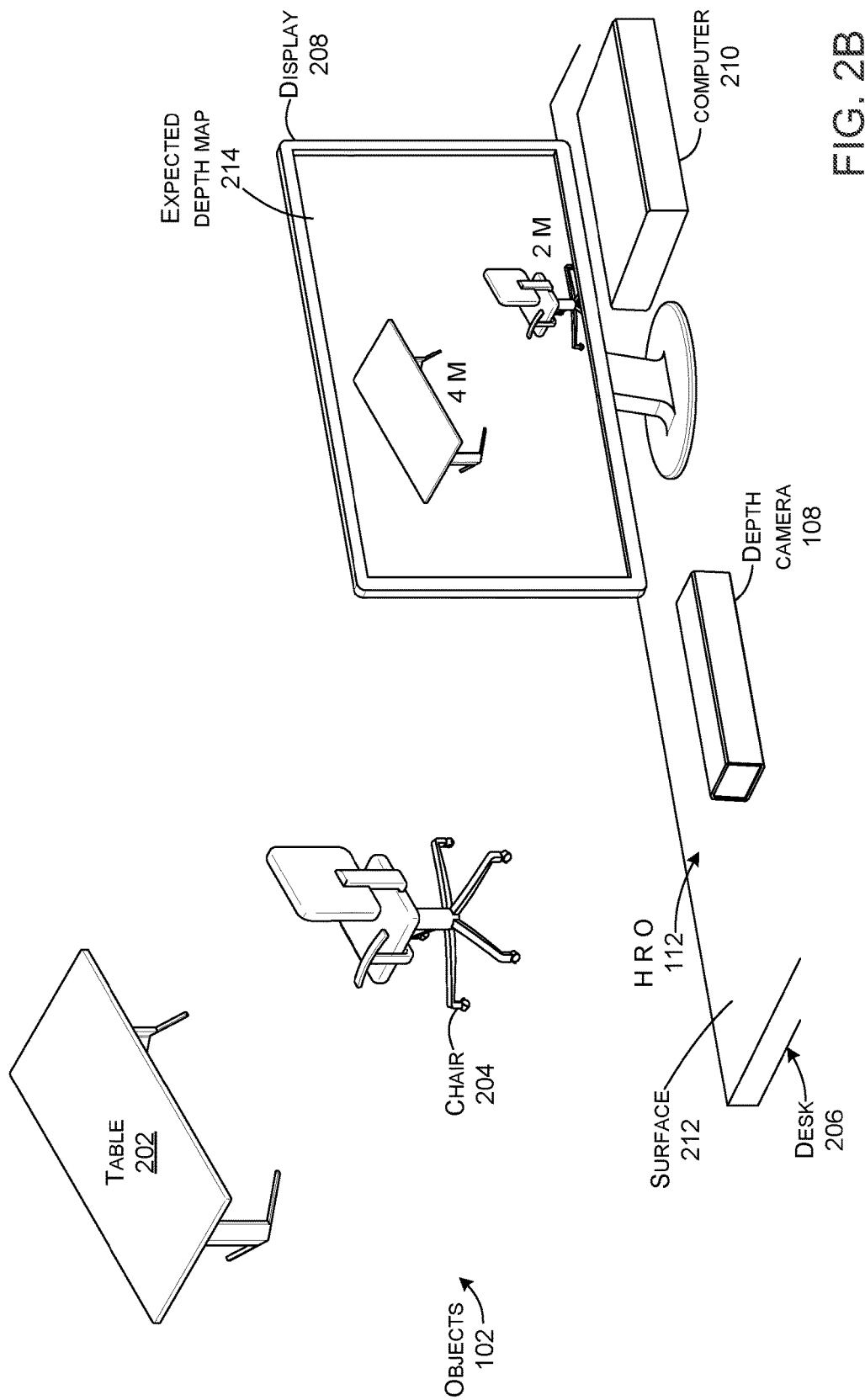
Figure 2C:
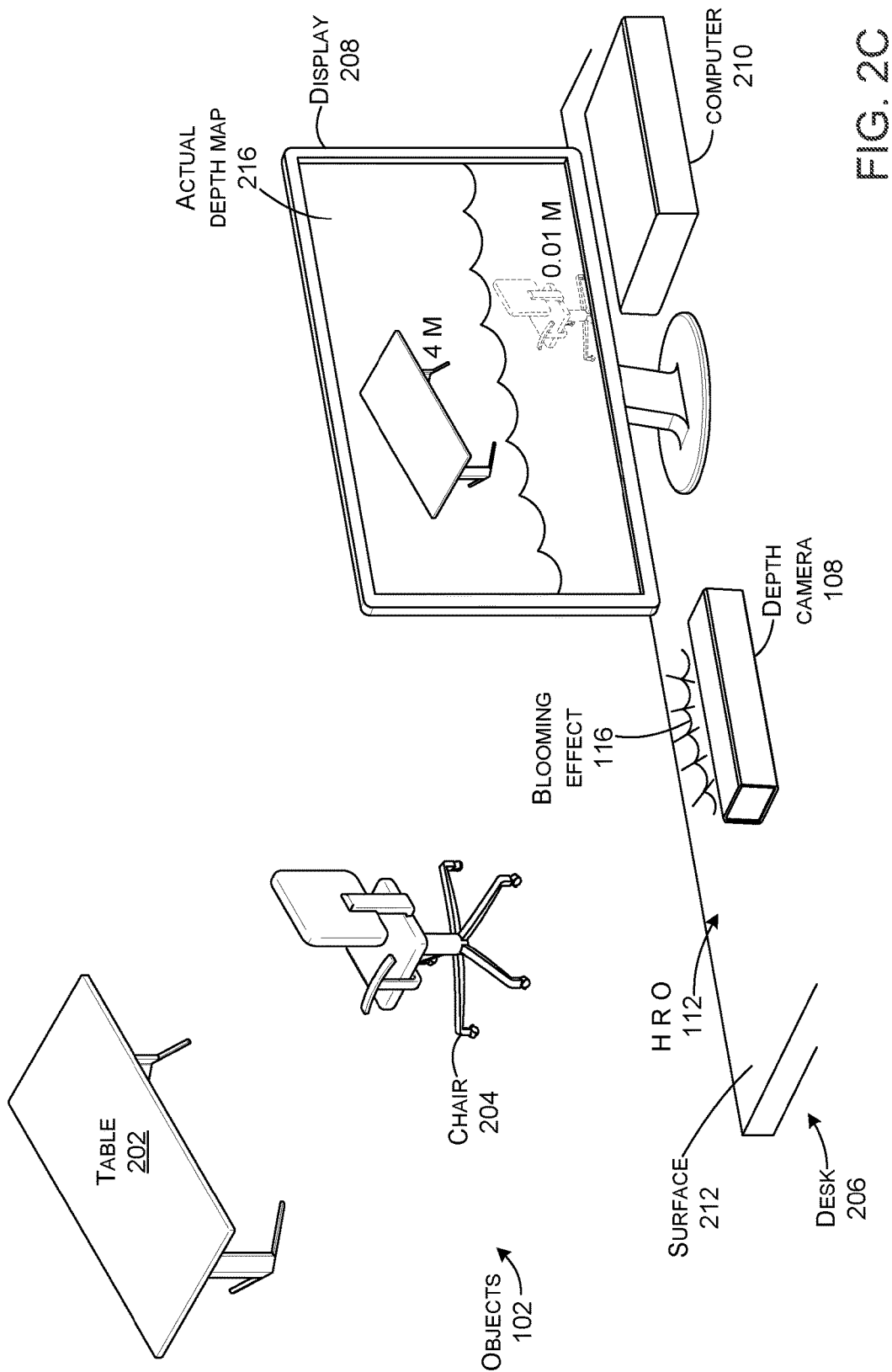

FIGS. 2A-2C collectively show another scene 100E. (The suffix 'E' is used to distinguish this scene from the scenes discussed relative to FIGS. 1A-1G and to convey that the elements of scene 100E may be different than those of FIGS. 1A-1G. Suffixes 'A'-'D' were used in the discussion above).

As shown in FIG. 2A, scene 100E involves objects 102 in the form of a table 202, a chair 204, and a desk 206. Positioned on the desk 206 are a depth camera 108, a display 208, and a computer 210. The depth camera 108 is positioned on a surface 212 of the desk 206 and is facing toward the table 202 and the chair 204. In this case, the surface 212 acts as a highly reflective object 112 relative to the depth camera 108. Assume for purposes of explanation, that depth camera 108 and computer 210 are connected to display 208. Assume further that chair 204 is 2 meters in front of the depth camera 108 and table 202 is 4 meters in front of the depth camera.

FIG. 2B shows an expected depth map 214 on display 208 of the scene 100E as sensed by the depth camera 108. As mentioned above, the expected distance to the chair 204 is 2 meters and to the table is 4 meters.

FIG. 2C shows an actual depth map 216 of the scene 100E as sensed by the depth camera 108. In this case, blooming effect 116 occurs when light signals emitted by depth camera 108 reflect off of the surface 212. This reflection from the surface 212 is so strong that it overwhelms signals returning from the chair 204, which is adjacent to the surface 212 in the line of sight of the depth camera. The overwhelming reflected signals from the surface 212 cause the distance to the chair 204 to be calculated as the distance to the surface (e.g., 0.01 meters) instead of the expected 2 meters. The blooming effect 116 does not affect areas of the depth camera's sensor receiving reflections from the table 202. Thus, the depth camera can calculate an accurate distance to the table 202 (e.g., the determined distance generally matches the actual or expected distance).

The present concepts can be employed to recognize the blooming effect 116. Once recognized, actions can be taken to diminish ramifications of the blooming effect. For instance, distances of objects 102 that are affected can be treated as suspicious. As described above relative to the discussion of FIGS. 1A-1G, the distances affected by the blooming effect can be invalidated, among other actions. Note that if not invalidated, the bloom affected pixels would have catastrophically false depth values (e.g., the distance to the surface of the table rather than the distance to the chair). This would likely severely impact customers of the depth maps, such as surface reconstruction applications, among others.

Figure 3:
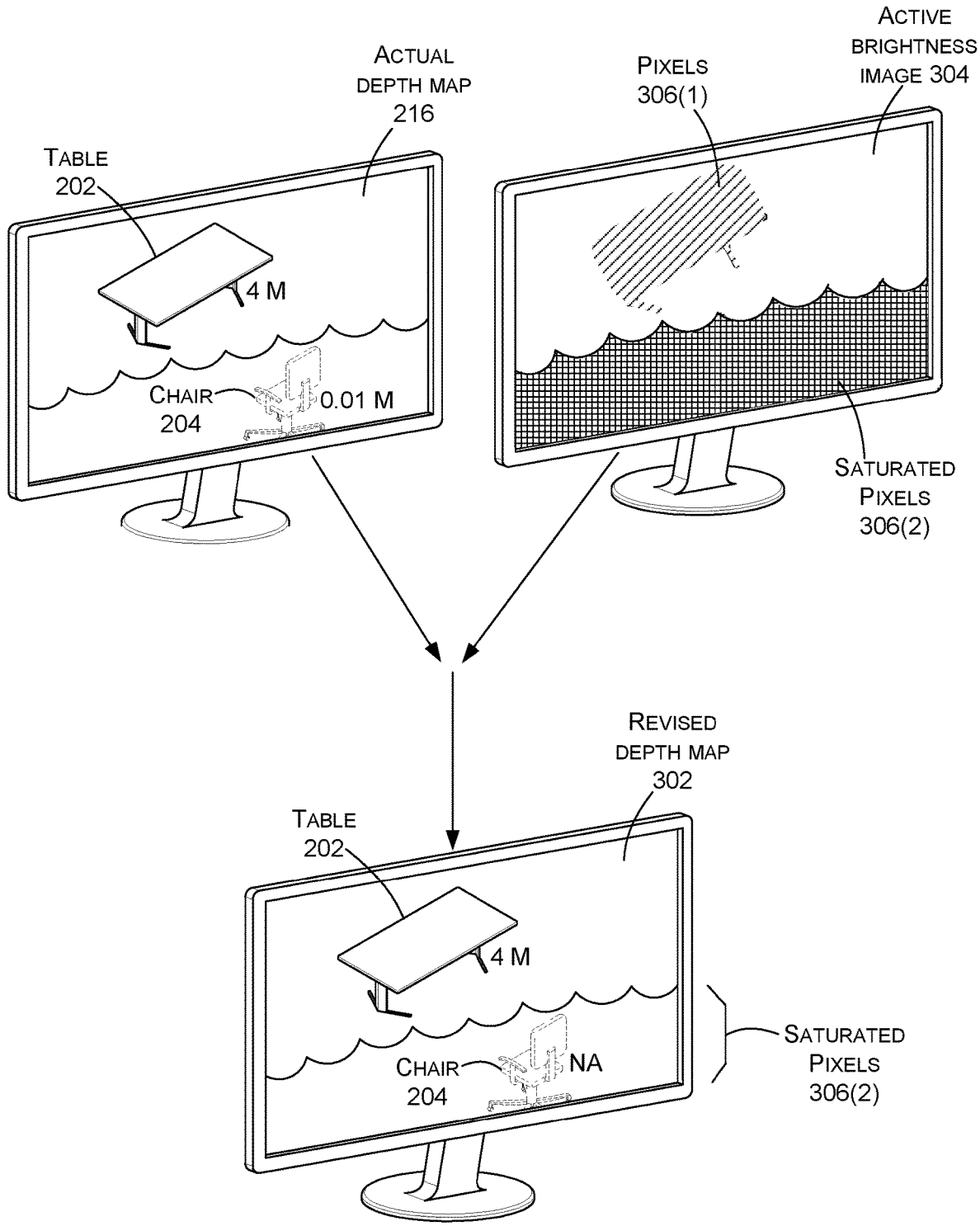
FIG. 3 shows an example bloom detection technique in accordance with some implementations of the present concepts.

FIG. 3 shows a technique 300 that can recognize blooming effects and generate a revised depth map 302. This technique can receive the actual depth map 216 and a corresponding active brightness image or active brightness map 304. The active brightness image 304 can be a product of the depth determination process. For instance, when the depth map 302 is determined by time-of-flight techniques (e.g., time-of-flight depth map), the active brightness image 304 can also be output.

The active brightness image 304 can show brightness levels of individual regions and/or pixels of the depth camera's sensors. The brightness level can be indicated as a percentage value, such as from 0% to 100% or as an absolute value. For instance, an 8-bit binary includes 256 brightness values (e.g., 0-255). In the illustrated example, pixels 306(1) relating to the table 202 are at 70% percent brightness, for instance, while pixels 306(2) that include the chair 204 are at 100% brightness (e.g., are saturated). In this technique, the saturated pixels are suspected of having erroneous depth values.

Actual depth map 216 and active brightness image 304 can be combined to generate revised depth map 302. The revised depth map indicates that the chair 204 is located within the region of saturated pixels 306(2) (e.g., group of adjacent saturated pixels). As such, the mapped distance of the chair 204 is likely erroneous. Accordingly, the distance of the chair in the revised depth map is indicated as not available (NA). Thus, in the revised depth map 302, pixels that were indicated in the actual depth map 216 to be valid, but that are associated with the blooming effect, can be indicated as invalid in the revised depth map.

Figure 4:
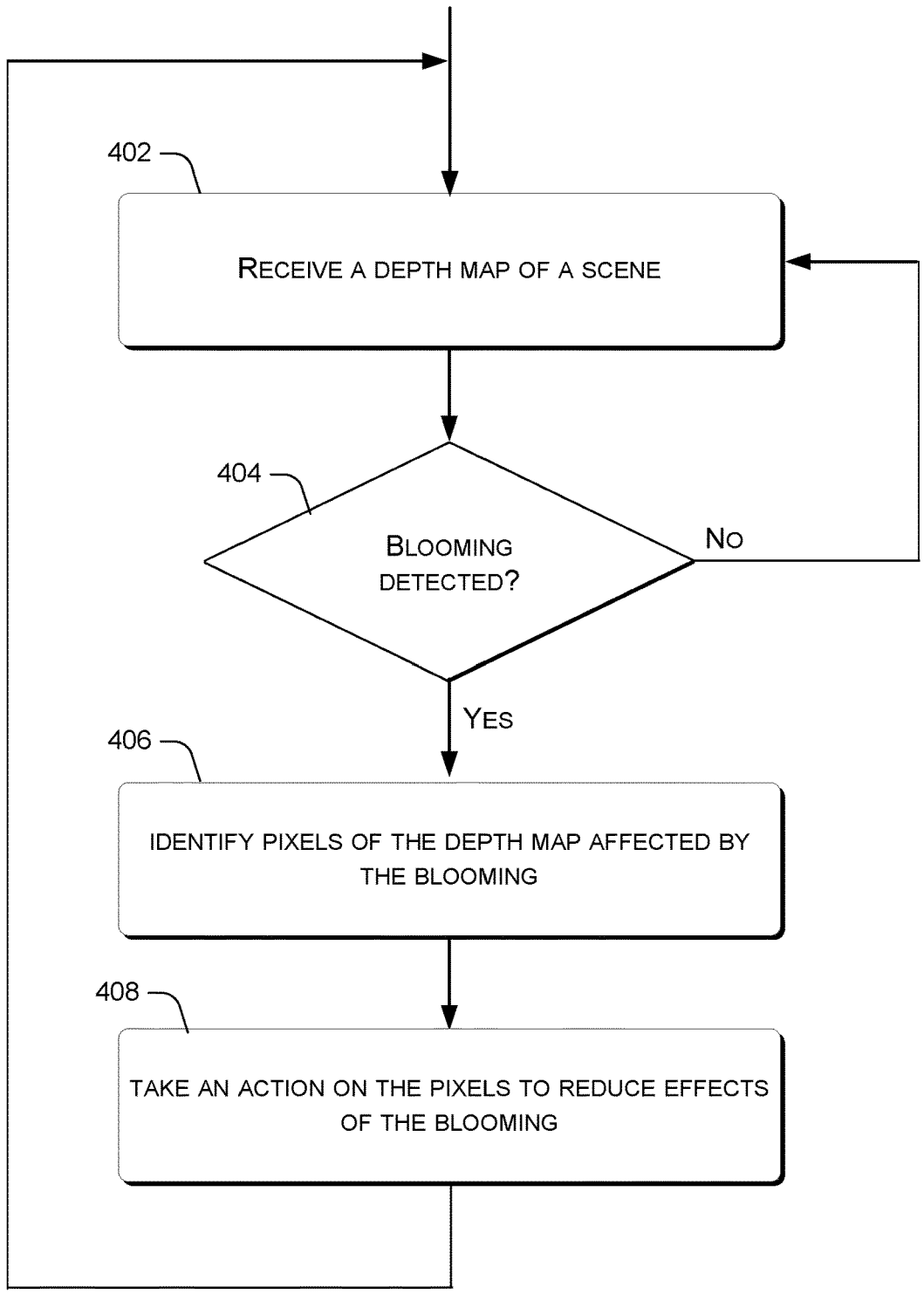
FIGS. 4 and 5 show example flowcharts for accomplishing bloom detection and reduction concepts in accordance with some implementations.

FIG. 4 shows another example bloom reduction method or technique 400. Block 402 can receive a depth map of a scene. The depth map can be produced utilizing various techniques, such as structured light, stereo imagery, light detection and ranging (LIDAR), and/or time of flight, among others. The depth map may include pixel brightness information, such as a reserved saturated pixel code, and/or be associated with a corresponding active brightness image that conveys pixel brightness information, among other techniques.

Block 404 can attempt to detect blooming in the depth map. In some implementations, the blooming can be detected by analyzing saturated pixels in the depth map. For instance, groups of adjacent saturated pixels can be indicative of blooming. Note, in some implementations the bloom detection can be achieved with relatively low resource usage. For instance, the depth map's active brightness image can be checked for saturated pixels. In another case, pixel brightness information can be stored with the depth map. This pixel brightness information can be accessed and utilized to identify saturated pixels. If no (or less than a threshold number of) saturated pixels are identified, no further resources need be utilized.

If no blooming is detected, the method can await the next depth map. The determination regarding blooming can be a binary determination (e.g., yes/no) or can be associated with a probability (e.g., 60%) that blooming occurred. This latter determination can be followed by nuanced actions to reduce effects of the blooming. For instance, if the depth map includes a small group of saturated pixels, there may be less confidence that blooming occurred. Thus, an appropriate response may be to simply void those pixels rather than inferring an effect onto adjacent pixels.

If blooming is detected, block 406 can identify pixels of the depth map affected by the blooming. The identified pixels can be all saturated pixels. Alternatively, the identified pixels can be groups of adjacent pixels (e.g., at least 1000 adjacent pixels that are all saturated). In this latter solution, not all pixels that are saturated are treated as being affected by blooming. In still another implementation, a distance can be determined for the blooming. For instance, in the example of FIGS. 1A-1G, the blooming effect is at 3 meters. Thus, all pixels that are recorded at 3 meters could be treated as being affected by the blooming. Alternatively, only those pixels at 3 meters that are contiguous with the blooming effect are treated as being affected.

Block 408 can then take an action on the pixels to reduce effects of the blooming. The action could be attempting to correct the distance of the pixels affected by the blooming. Another action could be associating a notation with the values of the pixels that the distances may not be reliable.

Another action could be to invalidate the distances and substitute a value of 'void' or 'not available.'

Note that in some implementations the action can be taken relative to all pixels that have the depth associated with blooming. For instance, looking at FIG. 1E, saturated pixels are identified relative to person 104 and posts 106(3) and 106(4). Further, person 104 and posts 106(2), 106(3), and 106(4) are all indicated at 3 meters. Thus, pixels associated with all of these objects could be invalidated as shown in FIG. 1F. Alternatively, only pixels that are adjacent may be treated as being affected. In this case, the pixels associated with person 104 and posts 106(3) and 106(4) are adjacent, whereas they are spaced away from pixels associated with post 106(2). Thus, as shown in FIG. 1G, distances of pixels associated with person 104 and posts 106(3) and 106(4) (e.g., in the region of blooming effect 116) may be invalidated while the distances of pixels of post 106(2) may be maintained.

In one case, the action at block 408 can entail generating another depth map in which pixels affected by the blooming, such as those falling into a depth range associated with the blooming, are invalidated. For instance, the new (e.g., another or revised) depth map can be identical to the original depth map except that a subset of pixels that had valid depth readings in the original depth map have invalid 'null' readings in the new depth map. The subset of pixels may be limited to the saturated pixels. Alternatively, the subset of pixels may include saturated pixels and unsaturated pixels.

Figure 5:
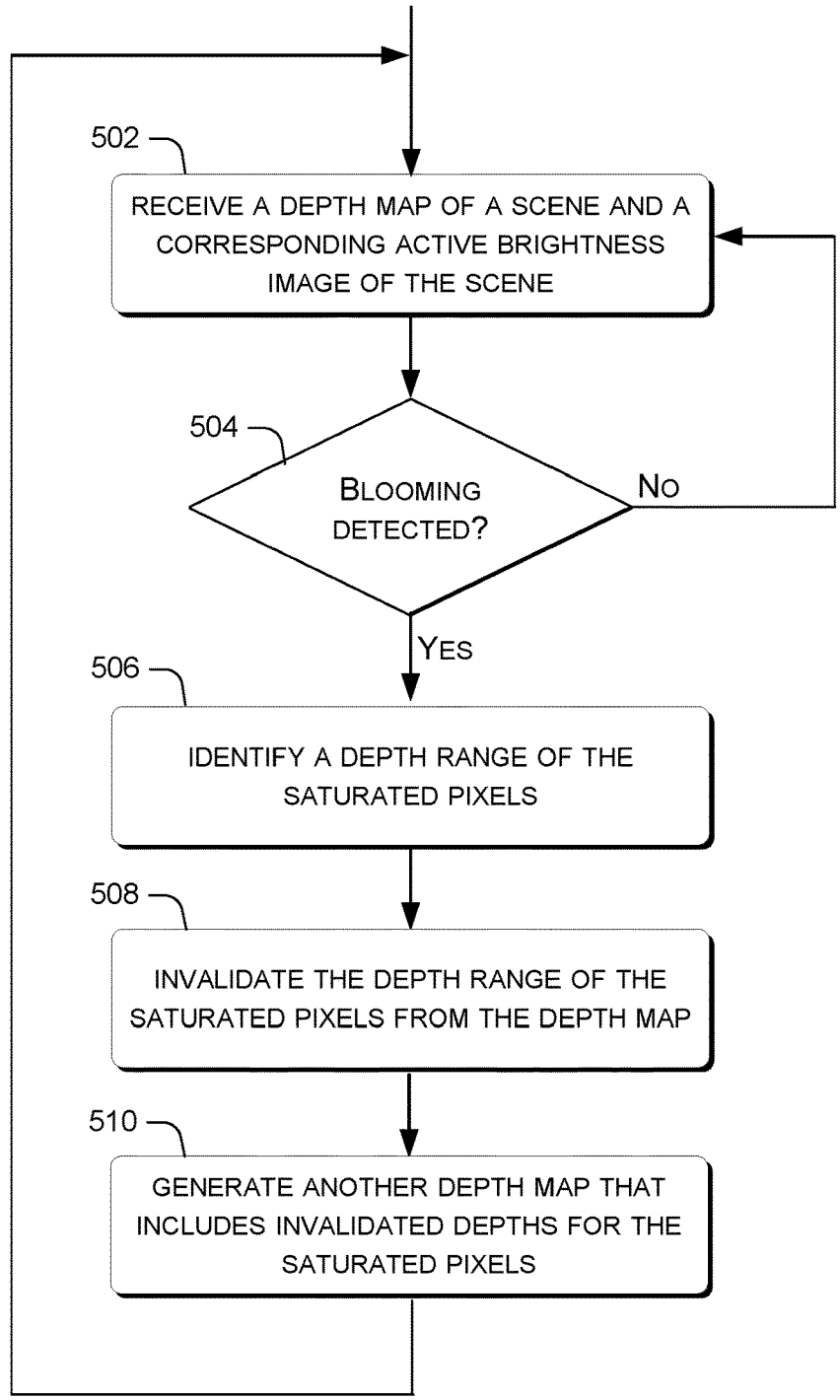

FIG. 5 shows another example bloom reduction method or technique 500. Block 502 can receive a depth map of a scene and a corresponding active brightness image of the scene. For instance, when time-of-flight techniques are used to generate the depth map, the active brightness image can be generated as a result of processing sensor data to produce the depth map.

Block 504 can determine whether blooming affected the depth map. In some implementations, the determination can be accomplished by counting the number of pixels that are saturated in the active brightness image. Some 3D cameras automatically mark saturated pixels with a special label. If the camera employed does not include this feature, the active brightness value of a pixel can be compared to a predefined active brightness threshold. The pixel can be declared saturated if the pixel's active brightness value exceeds the threshold. Thus, a determination can be made whether individual pixels are saturated and then a determination can be made regarding the total number of saturated pixels in the active brightness image.

If the number of saturated pixels exceeds a saturation threshold then the determination can indicate blooming occurred. For instance, the saturation threshold could be set at 1% of the total number of pixels in the active brightness image. If the saturation threshold is exceeded, blooming is detected (e.g., 'yes' at 504) and the method proceeds to block 506, otherwise, the method awaits the next depth map.

Block 506 can identify a depth range of the saturated pixels. For instance, the depth range can be determined by comparing, such as overlaying, the depth map and the active brightness image (see for instance, FIG. 3). In that example, the depth range (from the actual depth map 216) that contains the saturated pixels (306(2) from the active brightness image 304) is 0.01 meters. Thus, the depth range of the saturated pixels is 0.01. Note that while a specific depth value is shown here, the depth value may be a range, such as 0.008 meters to 0.012 meters for instance. Note also, that a scene could have more than one highly reflective object 112. For instance, the person from FIGS. 1A-1G could stand next to the table 202 in FIGS. 2A-2C. In such a case, there could be a range of saturated pixels cause by the surface 212 of the desk at 0.01 meters and a second range at 4 meters from the person's reflective safety vest 114.

Block 508 can invalidate the depth range of the saturated pixels from the depth map. The action can be taken relative to all pixels at the depth range or a sub-set of those pixels. For instance, a group of adjacent pixels may be saturated and may represent a blooming effect. However, another pixel or pixels may be saturated, but may not be aligned with the group of pixels (e.g., not aligned with the group of pixels in a line of sight of the sensors). This pixel or pixels may not be affected by blooming.

Block 510 can generate another depth map that includes invalidated depths for the saturated pixels. Various examples are described above where the values of the saturated pixels are revised to 'null' in the another (e.g., revised) depth map.

One example implementation that is consistent with method 500 is now discussed in detail. This method is explained relative to time-of-flight technology, and is applicable to other technologies. Time-of-flight and structured light technologies, generally employ infrared (IR) light that is invisible to the user. Recall that blooming typically occurs if there is an object (e.g., a highly reflective object) in the scene that reflects a very high amount of light (in this case IR light). The typical blooming artefact is that the depth of this highly reflective object overwrites the depth values of other pixels that capture objects returning a lower amount of light (see FIG. 1E). Therefore, the implementation can identify the depth value of the object causing the blooming, and then invalidate pixels that are assigned to this particular depth value.

The implementation can compute the set of all valid depth pixels that have a spatial neighbor that is saturated. For instance, spatial neighbors can be defined as 8-connected pixels. 8-connected pixels are neighbors to every pixel that touches one or their edges or corners. This set of pixels can be referred to the transition zone set. From another perspective, the method can identify saturated pixels and pixels that are adjacent to saturated pixels.

The implementation can generate a histogram of depth values for the transition zone set. Each bin of the histogram can capture a depth range. For instance, in one example the histogram can include 1400 bins and each bin in the histogram can capture a depth range of 5 mm. Thus, this example histogram can capture a total depth range between 0 mm and 5*1400=7000 mm. This implementation can insert the depth of each pixel of the transition zone set into the histogram. For example, if a pixel of the transition zone set has a depth value of 3000 mm, the implementation can add a count of 1 to the 3000/5=600th bin of this histogram.

Some versions can apply histogram smoothing to fill in gaps in the histogram. This smoothing can be accomplished by replacing every bin's value with an average value. This average can be computed over the current bin's value as well as its adjacent neighboring bins (e.g., its two left and its two right neighboring bins, for example).

The implementation can estimate a depth range affected by the blooming [Dmin, Dmax]. The estimate can be more robust based upon the smoothing performed above. The estimate can be generated by computing the largest sequence of consecutive bins in the smoothed histogram where each bin of that sequence has a count larger than 0. Note that this method can assume that there is only one object causing blooming in the scene. As mentioned above, there could be multiple highly reflective objects in the scene causing multiple blooming effects (e.g., a first distance range affected by a first bloom and a second distance range affected by a second bloom). The estimate can be extended to two objects by computing the largest two sequences in the smoothed histogram.

The implementation can now generate the final depth map by traversing all pixels of the original depth map. If the depth value of a pixel does not fall within the interval [Dmin, Dmax], the pixel's depth value can be copied to the final depth map. Conversely, if the pixel's depth value falls into the depth interval, the pixel can be invalidated in the final depth map.

An alternative bloom reduction method is described below. This method takes advantage of the shape of the depth camera's illumination pattern. This particular implementation is described relative to a depth camera that creates a depth map that includes an illumination pattern, such as a has a hexagonal shape. The unilluminated parts of the depth map (e.g., those outside the illumination pattern) can provide useful information, as they should have an active brightness very close to 0. If they do not, this is likely due to blooming. Hence the unilluminated regions of the image can provide a direct reading of the blooming signal. Since the signal added by blooming can be directly observed in the unilluminated regions, this signal can be subtracted from the observed signal. The resulting corrected/revised depth map can have reduced blooming effects.

Figure 6:
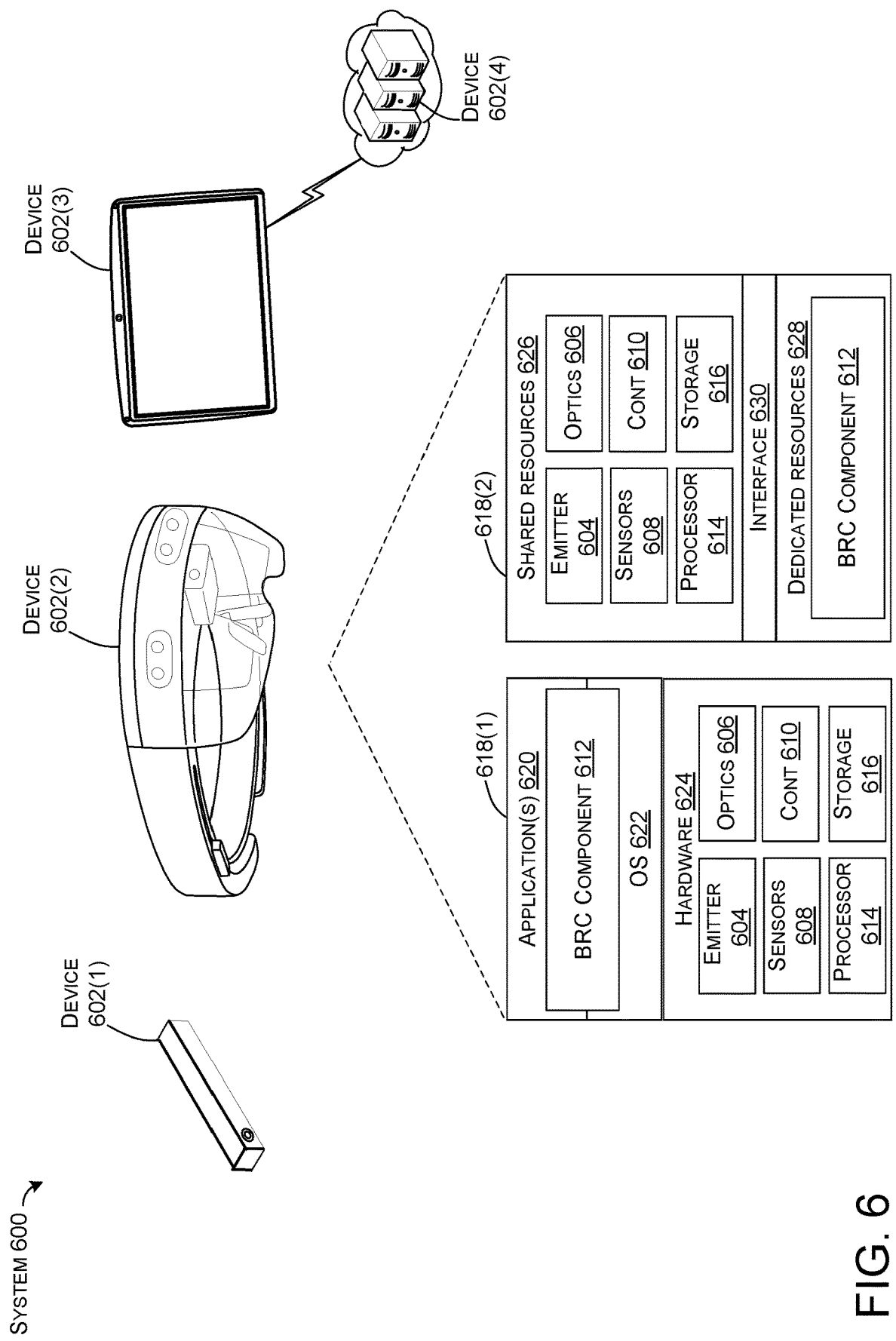
FIG. 6 shows an example system for accomplishing the present bloom reduction concepts.

FIG. 6 shows a system 600 that can accomplish bloom reduction concepts. For purposes of explanation, system 600 can include four devices 602(1), 602(2), 602(3), and 602(4). Device 602(1) is manifest as a depth camera that is similar to depth camera 108 of FIG. 1A. Device 602(2) is manifest as a head mounted augmented reality device, and device 602(3) is manifest as a tablet-type device. Any of these devices can be free-standing and/or can communicate with other devices, such as server-type devices 602(4). Individual devices 602 can include an emitter 604, optics 606, sensor 608, controller 610, a bloom reduction computation component 612, a processor 614, and/or storage 616.

FIG. 6 shows two device configurations 618 that can be employed by devices 602. Individual devices 602 can employ either of configurations 618(1) or 618(2), or an alternate configuration. (Due to space constraints on the drawing page, one instance of each device configuration is illustrated rather than illustrating the device configurations relative to each device 602). Briefly, device configuration 618(1) represents an operating system (OS) centric configuration. Device configuration 618(2) represents a system on a chip (SOC) configuration. Device configuration 618(1) is organized into one or more applications 620, operating system 622, and hardware 624. Device configuration 618(2) is organized into shared resources 626, dedicated resources 628, and an interface 630 therebetween.

In some implementations, the emitter 604 emits light, such as IR light. The optics 606 receive reflected light from the scene and focus the reflected light on sensor 608. The controller 610 can coordinate the function of the emitter 604 and sensor 608. The bloom reduction computation component 612 can generate depth maps by analyzing the emitted light and the sensed reflected light. The bloom reduction computation component 612 can analyze the depth maps to detect blooming, identify a depth range affected by the blooming, and/or take an action relating to the depth range.

In some configurations, each of devices 602 can have an instance of the bloom reduction computation component 612. However, the functionalities that can be performed by bloom reduction computation component 612 may be the same or they may be different from one another. For instance, in some cases, each device's bloom reduction computation component 612 can be robust and provide all of the functionality described above and below (e.g., a device-centric implementation). In other cases, some devices can employ a less robust instance of the bloom reduction computation component 612 that relies on some functionality to be performed by another device. For instance, device 602(4) may have more processing resources than device 602(1). In such a configuration, some bloom reduction computation component functions may be performed on device 602(4) rather than device 602(1).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 602 can include traditional computing devices, such as personal computers, desktop computers, servers, notebook computers, vehicles, smart cameras, surveillance devices/systems, safety devices/systems, wearable smart devices, appliances, and other developing and/or yet to be developed device types, etc.

As mentioned above, device configuration 618(2) can be thought of as a system on a chip (SOC) type design. In such a case, functionality provided by the device can be integrated on a single SOC or multiple coupled SOCs. One or more processors 614 can be configured to coordinate with shared resources 626, such as memory/storage 616, etc., and/or one or more dedicated resources 628, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a method comprising receiving a depth map of a scene and a corresponding active brightness image of the scene, detecting blooming in the depth map at least in part from saturated pixels in the active brightness image, identifying a depth range of the saturated pixels, invalidating the depth range of the saturated pixels from the depth map, and generating another depth map that includes invalidated depths for the saturated pixels.

Another example can include any of the above and/or below examples where the receiving comprises receiving the depth map from a time-of-flight camera.

Another example can include any of the above and/or below examples where the invalidating the depth range of the saturated pixels comprises invalidating only saturated pixels.

Another example can include any of the above and/or below examples where the invalidating the depth range of the saturated pixels comprises invalidating saturated pixels and unsaturated pixels.

Another example can include any of the above and/or below examples where the detecting blooming in the depth map comprises making a binary determination whether blooming occurs in the depth map.

Another example can include any of the above and/or below examples where the making a binary determination is based at least in part upon a number of saturated pixels in the active brightness image.

Another example can include any of the above and/or below examples where the making a binary determination is based at least in part upon a number of saturated pixels in the active brightness image that are adjacent to one another.

Another example can include any of the above and/or below examples where the detecting comprises computing a set of all valid depth pixels that have a spatial neighbor that is saturated.

Another example can include any of the above and/or below examples where the identifying comprises generating a histogram of depth values for the set.

Another example can include any of the above and/or below examples where the method further comprises smoothing the histogram.

Another example can include any of the above and/or below examples where the smoothing comprises replacing a value of individual bins of the histogram with an average value.

Another example can include any of the above and/or below examples where the replacing comprises calculating the average value as the value of an individual bin averaged with at least two adjacent neighboring bins.

Another example includes a system comprising a depth camera configured to capture a depth map of a scene and a processor configured to: detect blooming in the depth map, identify a depth range affected by the blooming, and take action relating to the depth range.

Another example can include any of the above and/or below examples where the depth camera and the processor are implemented on a single device.

Another example can include any of the above and/or below examples where the depth camera is manifest on a first device and the processor is implemented on a second device.

Another example can include any of the above and/or below examples where the processor is configured to identify the depth range by identifying saturated pixels and adjacent pixels of the depth map.

Another example can include any of the above and/or below examples where the processor is configured to take the action where the action is invalidating the depth range.

Another example can include any of the above and/or below examples where the processor is configured to perform the invalidating only on regions of the depth range that are aligned with saturated pixels in an active brightness image that corresponds to the depth map.

Another example can include any of the above and/or below examples where the depth camera is configured to store pixel brightness information with the depth map and the processor is configured to detect the blooming at least in part from the pixel brightness information, or wherein the depth camera is configured to generate an active brightness image that corresponds to the depth map and the processor is configured to detect the blooming at least in part from the active brightness image.

Another example includes a device comprising a depth camera configured to generate a depth map of a scene and a bloom reduction computation component configured to detect blooming in the depth map, identify pixels of the depth map affected by the blooming, and, take an action on the pixels to reduce effects of the blooming.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to bloom reduction are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A method, comprising:
receiving a depth map of a scene and a corresponding active brightness image of the scene;
detecting blooming in the depth map at least in part from saturated pixels in the active brightness image;
identifying a depth range of the saturated pixels;
invalidating the depth range of the saturated pixels from the depth map; and,
generating another depth map that includes invalidated depths for the saturated pixels.

2. The method of claim 1, wherein the receiving comprises receiving the depth map from a time-of-flight camera.

3. The method of claim 1, wherein the invalidating the depth range of the saturated pixels comprises invalidating only saturated pixels.

4. The method of claim 1, wherein the invalidating the depth range of the saturated pixels comprises invalidating saturated pixels and unsaturated pixels.

5. The method of claim 1, wherein the detecting blooming in the depth map comprises making a binary determination whether blooming occurs in the depth map.

6. The method of claim 5, wherein the making a binary determination is based at least in part upon a number of saturated pixels in the active brightness image.

7. The method of claim 6, wherein the making a binary determination is based at least in part upon a number of saturated pixels in the active brightness image that are adjacent to one another.

8. The method of claim 1, wherein the detecting comprises computing a set of all valid depth pixels that have a spatial neighbor that is saturated.

9. The method of claim 8, wherein the identifying comprises generating a histogram of depth values for the set.

10. The method of claim 9, further comprising smoothing the histogram.

11. The method of claim 10, wherein the smoothing comprises replacing a value of individual bins of the histogram with an average value.

12. The method of claim 11, wherein the replacing comprises calculating the average value as the value of an individual bin averaged with at least two adjacent neighboring bins.

13. A system, comprising:
a depth camera configured to capture a depth map and a corresponding active brightness image of a scene; and,
a processor configured to:
detect blooming in the depth map at least in part from saturated pixels in the active brightness image,
identify a depth range of the saturated pixels, invalidate the depth range of the saturated pixels from the depth map, and generate another depth map that includes invalidated depths for the depth range.

14. The system of claim 13, wherein the depth camera and the processor are implemented on a single device.

15. The system of claim 13, wherein the depth camera is manifest on a first device and the processor is implemented on a second device.

16. The system of claim 13, wherein the processor is configured to identify the depth range by identifying saturated pixels and adjacent pixels of the depth map.

17. The system of claim 13, wherein the processor is configured to perform the invalidating only on regions of the depth range that are aligned with saturated pixels in the active brightness image that corresponds to the depth map.

18. The system of claim 13, wherein the depth camera and the processor are implemented on separate devices.

19. A device comprising:
a depth camera configured to generate a depth map and a corresponding active brightness image of a scene; and,
a bloom reduction computation component configured to detect blooming in the depth map based at least in part on saturated pixels of the active brightness image, identify a depth range of the saturated pixels, invalidate the depth range of the saturated pixels from the depth map, and generate another depth map that includes invalidated depths for the saturated pixels.

* * * * *